United States Patent
Wislinski

[11] Patent Number: 6,073,877
[45] Date of Patent: Jun. 13, 2000

[54] APPARATUS AND METHOD FOR WINDING AN OPTICAL FIBER

[75] Inventor: Martin T. Wislinski, Edison, N.J.

[73] Assignee: Tyco Submarine Systems Ltd

[21] Appl. No.: 09/163,390

[22] Filed: Sep. 30, 1998

[51] Int. Cl.[7] .......................... B65H 54/12; B65H 54/20; B65H 54/547

[52] U.S. Cl. .................................. 242/474.8; 242/388.6; 242/405.2; 242/487

[58] Field of Search .............................. 242/486.8, 486.9, 242/487, 388.6, 388.1, 388.5, 405, 405.1, 405.2, 405.3, 129.71, 474.8; 382/135

[56] References Cited

U.S. PATENT DOCUMENTS

| | | | |
|---|---|---|---|
| 3,208,121 | 9/1965 | Price | 242/388.1 |
| 3,355,129 | 11/1967 | Kinsey | 242/388.6 |
| 3,809,331 | 5/1974 | Gaul | 242/395 |
| 4,386,621 | 6/1983 | Redl | 242/388.6 |
| 4,489,902 | 12/1984 | Chaconas | 242/388.1 |
| 4,557,430 | 12/1985 | Bonhard | 242/405.3 |
| 4,762,286 | 8/1988 | Crow | 242/486.9 |
| 4,796,827 | 1/1989 | Munt et al. | 242/388.6 |

*Primary Examiner*—John M. Jillions

[57] ABSTRACT

A fiber winding and storage assembly is disclosed. The fiber winding and storage assembly includes a fiber winding fixture and a fiber storage device. The fiber winding fixture includes a winding structure, a handle member and a mounting member. The winding structure has a first side and a second side where the first side defines a recess therein. The handle member is attached to the second side of the winding structure. The mounting member is disposed within the recess of the winding structure and extends perpendicularly therefrom. The fiber storage device is received within the recess of the fiber winding fixture.

22 Claims, 5 Drawing Sheets

APPARATUS AND METHOD FOR WINDING AN OPTICAL FIBER

BACKGROUND OF THE INVENTION

The present invention relates to an apparatus and method for winding optical fiber. More specifically, the invention provides a fiber storage device and a fixture for assisting in winding a fiber onto the storage device.

The storage device has two storage tracks which extend around the circumference of the device and the two tracks are separated from each other by a center wall. The storage device is designed to store a length of fiber that is jacketed on one portion of the fiber length and unjacketed on the second portion of the fiber length. The jacketed portion is wound in one track of the storage device and the unjacketed portion is wound in the second track of the storage device. The center wall contains an opening within it. The transition point between the unjacketed fiber and the jacketed fiber, where the unjacketed fiber is stored in one track and the jacketed fiber is stored in the second track of the storage device, is placed within the opening in the center wall. Thus, a cross-over can occur through the center wall between the unjacketed fiber and the jacketed fiber in order to store each portion of the fiber length in a separate track.

There are problems, however, with winding the fiber onto the storage device. Typically, the different portions of the fiber, i.e., the unjacketed fiber and the jacketed fiber, will cross-over from one track to the other track. For example, the jacketed portion, which is to be stored in one of the tracks will, during the winding process, cross-over and be wound in the other of the tracks. This fiber cross-over between tracks can occur by the fiber either crossing over the center wall that separates the tracks or by crossing over through the opening in the wall that separates the tracks. In either situation, the fiber can be damaged by the cross-over. In the situation where the fiber crosses over the center wall, the fiber can be subjected to stresses. In the situation where the fiber crosses over through the opening in the center wall, the fiber of one type, e.g, the jacketed fiber, can be trapped underneath fiber of another type wound in that track, e.g., the unjacketed fiber, and thus possibly be broken when the operator uncoils the fiber when needed.

Therefore, it would be desirable to provide an assembly that could assist an operator in winding and storing optical fiber.

SUMMARY OF THE INVENTION

In accordance with one embodiment of the present invention, a fiber winding and storage assembly is disclosed. The fiber winding and storage assembly includes a fiber winding fixture and a fiber storage device. The fiber winding fixture includes a winding structure, a handle member, and a mounting member. The winding structure has a first side and a second side where the first side defines a recess therein. The handle member is attached to the second side of the winding structure. The mounting member is disposed within the recess of the winding structure and extends perpendicularly therefrom. The fiber storage device is received within the recess of the fiber winding fixture.

DETAILED DESCRIPTION

Figure 1:
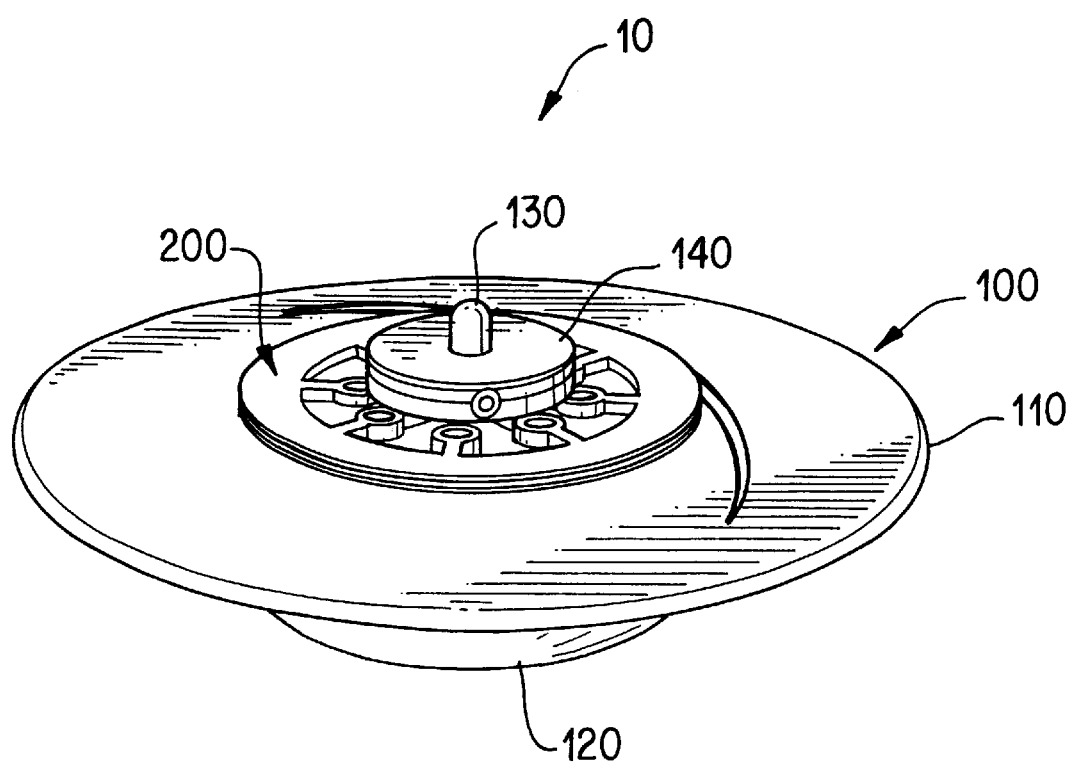
FIG. 1 is a perspective view of an embodiment of a fiber winding fixture with a fiber storage device placed within it.

FIG. 1 illustrates an embodiment for the fiber winding and storage assembly 10 of the present invention. As can be seen in FIG. 1, fiber winding and storage assembly 10 includes a fiber winding fixture 100 and a fiber storage device 200. Fiber storage device 200 is received within fiber winding fixture 100 where, as will be explained further later in this specification, winding structure 110 of fiber winding fixture 100 assists a user in winding a length of optical fiber onto fiber storage device 200.

Also illustrated in FIG. 1 is mounting member 130 and retaining member 140. As will also be further explained later in this specification, fiber storage device 200 is positioned within fiber winding fixture 100 by mounting the fiber storage device 200 on the mounting member 130. Retaining member 140 is positioned on mounting member 130 and retains fiber storage device 200 within fiber winding fixture 100. Handle member 120 is disposed on an underside, or second side, of fiber winding structure 110 and is utilized by a user of the fiber winding and storage assembly 10 to hold the fiber winding fixture 100.

Figure 2:
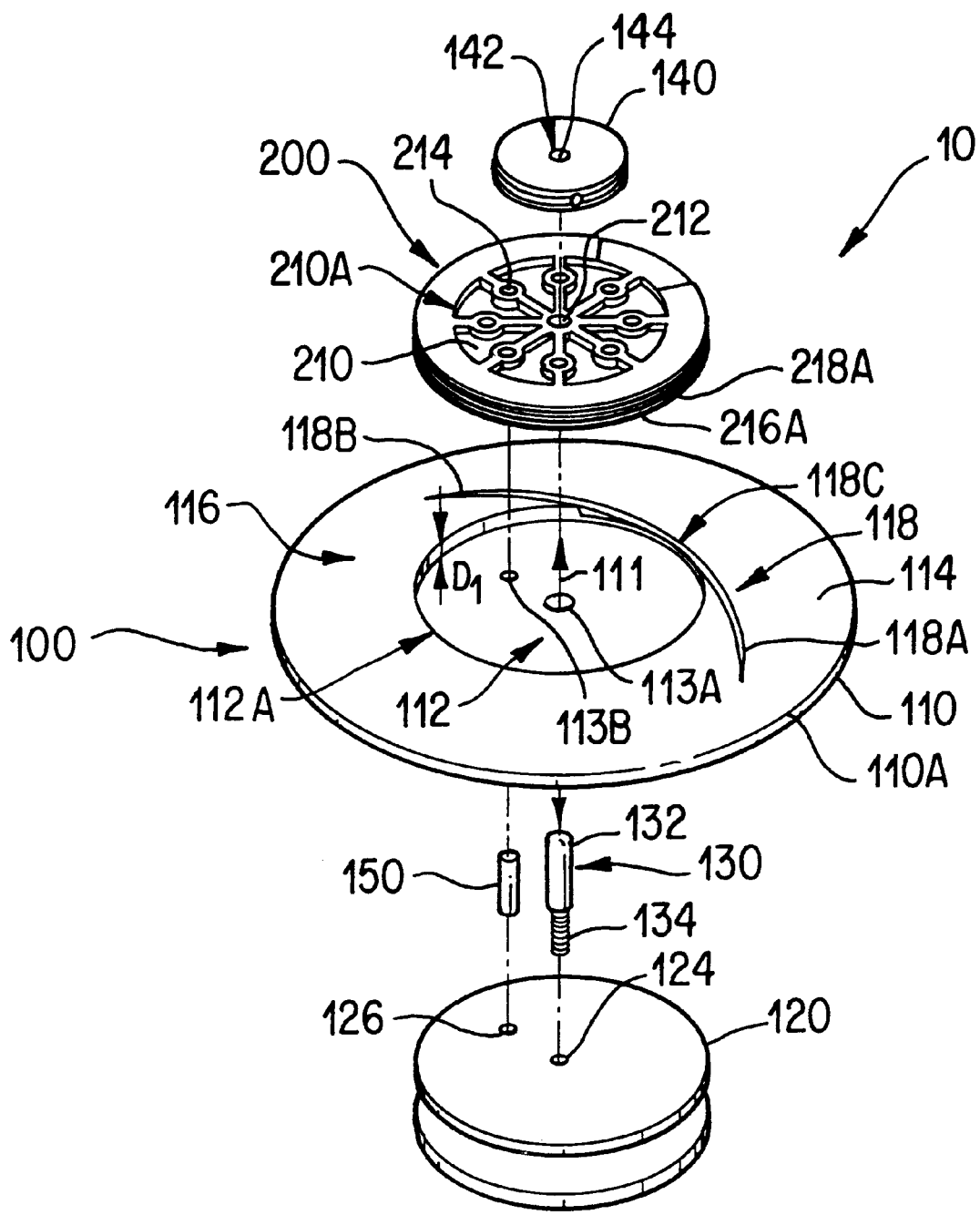
FIG. 2 is an exploded perspective view of the fiber winding fixture and fiber storage device of FIG. 1.

A more detailed description of the components of the fiber winding and storage assembly 10 will now be provided. FIG. 2 is an exploded, perspective view of fiber winding and storage assembly 10. As was mentioned previously, fiber winding fixture 100 includes a winding structure 110, a handle member 120, a mounting member 130 and a retaining member 140. Winding structure 110 is a circularly-shaped structure that includes a first side 116, or fiber winding side, and a second side, or underside, 117 (not visible in FIG. 2) to which is attached handle member 120. First side 116 of winding structure 110 defines a recess 112 and a winding surface 114. As can be seen in FIG. 2, recess 112 is a circularly-formed recess. The depth of the recess $D_1$ is uniform across its diameter and extends, in one embodiment, a distance that is defined by the width of the lower track 216A of fiber storage device 200 plus approximately one third of the width of the upper track 218A of fiber storage device 200. Thus, as will be described further later in this specification, as fiber storage device 200 is placed into recess 112 of winding structure 110, the lower track 216A of fiber storage device 200 is completely received within recess 112. Additionally, a portion of the upper track 218A of fiber storage device 200 is also received within recess 112 of winding structure 110.

Winding structure 110, within recess 112, also defines a mounting member aperture 113A and a securement aperture 113B. Mounting member aperture 113A is positioned at the central axis 111 of winding structure 110 and securement aperture 113B is off-set a distance from central axis 111.

First side 116 of winding structure 110, as mentioned previously, defines winding surface 114. Winding surface 114 extends from the outer diameter 112A of recess 112 to the outer diameter 110A of winding structure 110. As can be more clearly seen in FIG. 7, winding surface 114 slopes from outer diameter 112A of recess 112 to outer diameter 110A of winding structure 110. The angle of the slope of winding surface 114 is approximately 9°–10°, however, a slope in the range of approximately 3°–20° is possible. As will be more fully described later in this specification, the purpose of winding surface 114, and particularly the slope of winding surface 114, is to assist a user in guiding a length of fiber into the upper track 218A of fiber storage device 200 when the user winds the length of fiber onto the fiber storage device 200.

Also included in winding surface 114 is a groove 118. As can be seen, groove 118 is comprised of a first side 118A, a second side 118B, and a transition portion 11 8C between the first side 118A and second side 118B. The groove 118 extends approximately around one-half of the circumference of winding structure 110. The depth of groove 118 is not rigidly defined, however, as will become more clear later in this specification, groove 118 receives within it an end portion of the jacketed fiber. Thus, groove 118 is of sufficient depth to receive within it a length of jacketed fiber such that the jacketed fiber does not extend above the plane of the winding surface 114 at least at the portion of the first and second sides 118A, 118B, respectively, of groove 118 that are closest in proximity to transition portion 118C. Transition portion 118C of groove 118 provides for an unobstructed path for a length of jacketed fiber as the jacketed fiber extends from lower track 216A of storage device 200 through recess 112 and into groove 118.

Groove 118 is formed within winding surface 114 such that as a length of unjacketed fiber is wound onto the upper track 218A of fiber storage device 200 when fiber storage device 200 has been positioned within recess 112 of winding structure 110, the groove will not interfere with the unjacketed length of fiber as it passes over winding surface 114. As the unjacketed fiber is wound onto fiber storage device 200, the unjacketed fiber extends generally perpendicular to the outer circumference of the winding surface 114 and the groove 118, therefore, is positioned generally perpendicular to the unjacketed length of fiber. Thus, this physical positioning of the unjacketed fiber with respect to the groove 118 as the unjacketed fiber is wound around the winding surface 114 helps to ensure that the unjacketed fiber is not oriented parallel to groove 118 which could result in the unjacketed fiber being caught within groove 118, which could possibly damage the unjacketed fiber.

Mounting member 130 is comprised of a mounting portion 132 and a threaded portion 134. Threaded portion 134 is received within first aperture 124 of handle member 120. Mounting portion 132 extends up through mounting member aperture 113A in recess 112 of winding structure 110 and extends above the upper-most horizontal plane of winding structure 110. Fiber storage device 200, which contains a mounting aperture 212 within it, is positioned on mounting member 130. Thus, mounting member 130 serves to assist in positioning fiber storage device 200 within winding structure 110.

Securement member 150 is attached to handle member 120. Securement member 150 is received within second aperture 126 in handle member 120 and extends up through securement aperture 113B in recess 112 of winding structure 110. Securement member 150 is positioned on handle member 120, and consequently within recess 112, off-set from the central axis of handle member 120 and winding structure 110. Securement member 150 is received within one of a plurality of securement apertures 214 that are included in fiber storage device 200. Because securement member 150 and the securement apertures 214 of the fiber storage device 200 are offset from the central axis of the fiber storage device 200, as securement member 150 is received within one of the plurality of securement apertures 214 it prevents rotation of fiber storage device 200 within winding structure 110.

Retaining member 140 is also illustrated in FIG. 2. Retaining member 140 includes an aperture 142. Mounting member 130 is received within aperture 142 of retaining member 140. Retaining member 140 is positioned on mounting member 130 after fiber storage device 200 has been positioned within recess 112 of winding structure 110. Thus, retaining member 140 serves to retain fiber storage device 200 within winding structure 110. Retaining member 140 should be of a lesser diameter than fiber storage device 200 such that, as retaining member 140 is utilized to secure fiber storage device 200 in winding structure 110, retaining member 140 will not impede a user from winding a length of optical fiber onto the fiber storage device 200.

Extending into aperture 142 of retaining member 140 are retention members 144. Even though all of the retention members 144 can not be seen in FIG. 2, a description of their operation and structure will make their purpose clear. Three retention members 144 are included in retaining member 140 which extend into aperture 142. Each retention member can be a ball-like structure which is biased such that it extends within a portion of aperture 142. As mounting member 130 is positioned within aperture 142 and moved through aperture 142, mounting member 130 will act upon retention members 144 and move the retention members within retaining member 140. However, the retention members still apply sufficient force against mounting member 130 such that retaining member 140 is secured to mounting member 130. Thus, the retention members provide for securing retention member 140 onto mounting member 130. It is not desirable to include threading within aperture 142 of retaining member 140 that would mate with threading on mounting portion 132 of mounting member 130 because any threaded surface on mounting member 130 could possibly damage the optical fiber as it is wound onto fiber storage device 200 if retaining member 140 is not utilized in conjunction with mounting member 130.

Handle member 120 is mounted on the second side, or underside, 117 of winding structure 110 by any of a variety of methods. Handle member 120 can be formed in any of a variety of configurations and the purpose of handle member 120 is to allow a user of the fiber winding fixture 100 to hold the fiber winding fixture 100 when using it to wind fiber on the fiber storage device 200.

Also illustrated in FIG. 2 is fiber storage device 200. Fiber storage device 200 is comprised of a support structure 210 which includes on its outer circumference 210A first lower track 216A and second upper storage track 218A, as mentioned previously. Each storage track extends around the entire circumference of support structure 210. As will be further described later in this specification, fiber storage device 200 can be utilized to store a length of optical fiber on it where the optical fiber includes a first jacketed portion and a second unjacketed portion. The first jacketed portion is wound and stored within first lower track 216A and the second unjacketed portion is wound and stored on second upper storage track 218A. A more detailed view of fiber storage device 200 can be seen in FIGS. 3–5.

Figure 3:
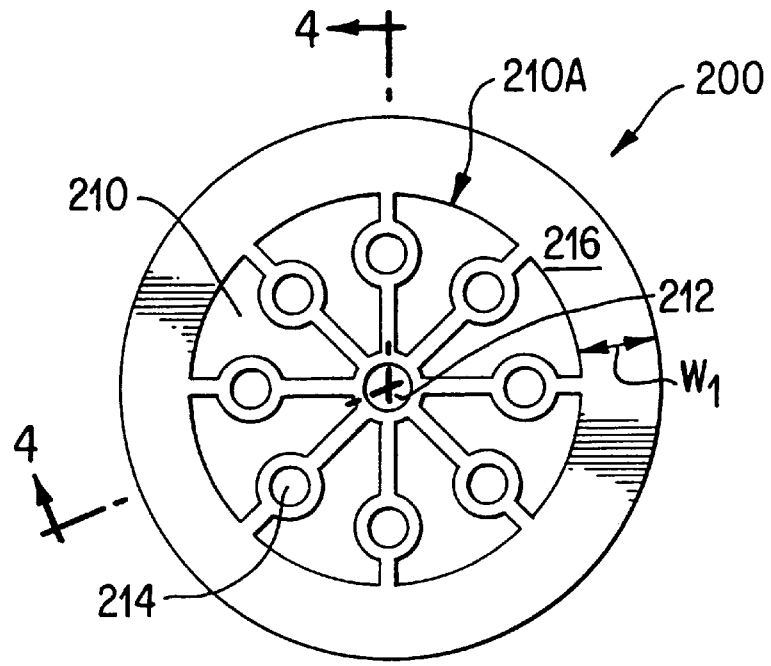
FIG. 3 is a bottom view of an embodiment of a fiber storage device.
Figure 4:
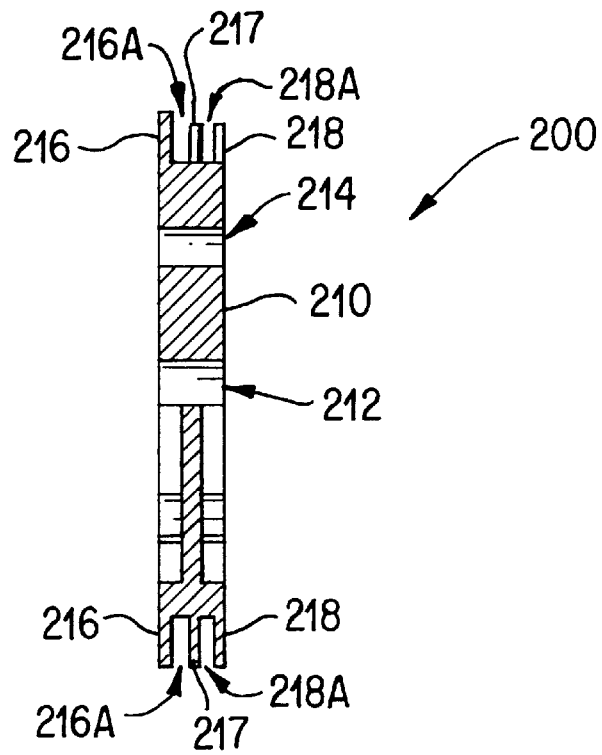
FIG. 4 is a cross-sectional view of the fiber storage device as taken along line 4—4 of FIG. 3.
Figure 5:
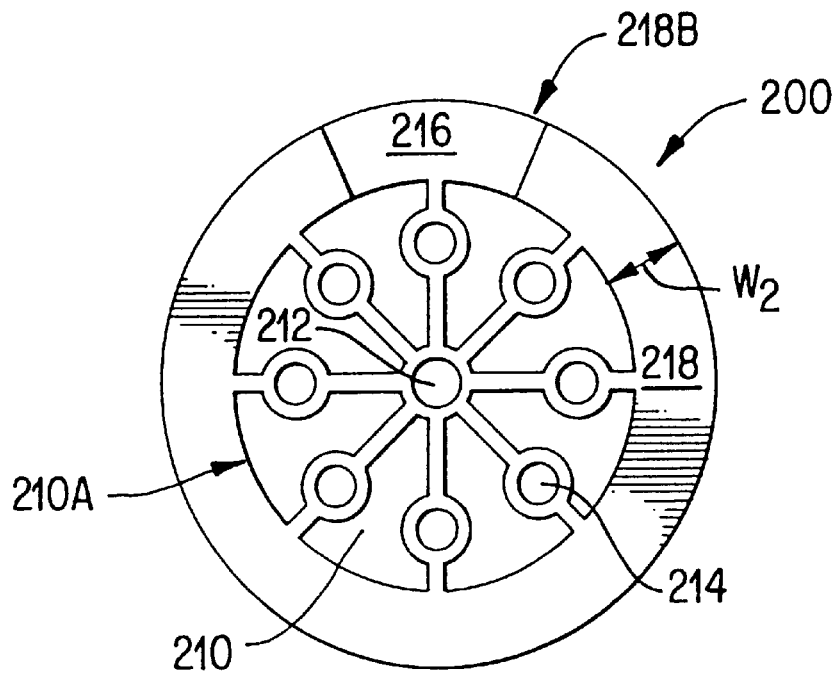
FIG. 5 is a top view of the fiber storage device of FIG. 3.

FIG. 3 is a bottom view of fiber storage device 200 and FIG. 5 is a top view of the fiber storage device. FIG. 4 is a cross-sectional view of fiber storage device 200 as taken along line 4—4 of FIG. 3. As can be seen in FIGS. 3–5, support structure 210 of fiber storage device 200 includes on its outer circumference 210A three walls which define the first lower storage track 216A and the second upper storage track 218A. As can be seen, bottom wall 216 is continuous in its width W, around the entire circumference of support structure 210. Top wall 218 and center wall 217 are not continuous in their width W, around the entire circumference of support structure 210. Thus, as can be seen in FIG. 5, an opening 218B in top wall 218 exists. A similar opening exists in the center wall 217, however, this opening can not be directly visualized in FIG. 5 since center wall 217 is disposed directly underneath top wall 218. The purpose of the opening within center wall 217 is to allow the length of fiber that is to be wound on fiber storage device 200 to transition from being wound on the lower track 216A to the upper track 218A at the location on the length of fiber where the transition from jacketed fiber to unjacketed fiber exists. Thus, the jacketed portion of the length of fiber is wound in the lower track 216A and the unjacketed portion of the optical fiber is wound in the upper track 218A with the transition between the jacketed fiber and unjacketed fiber being positioned within the opening that is included in center wall 217.

As can be clearly seen in FIG. 4 and as was described previously, bottom wall 216 and center wall 217 define lower track 216A. Top wall 218 and center wall 217 define upper track 218A. Also as was previously described, upper track 218A receives within it the unjacketed portion of the length of optical fiber that is wound on fiber storage device 200 and lower track 216A receives within it the jacketed portion of the fiber. As such, the width of the lower track 216A is slightly greater than the width of the upper track 218A. This is because, as described above, the lower track 216A stores jacketed fiber which is thicker in diameter than the unjacketed fiber. Lower track 216A is approximately 0.085 inches in width and upper track 218A is approximately 0.060 inches in width.

Figure 6:
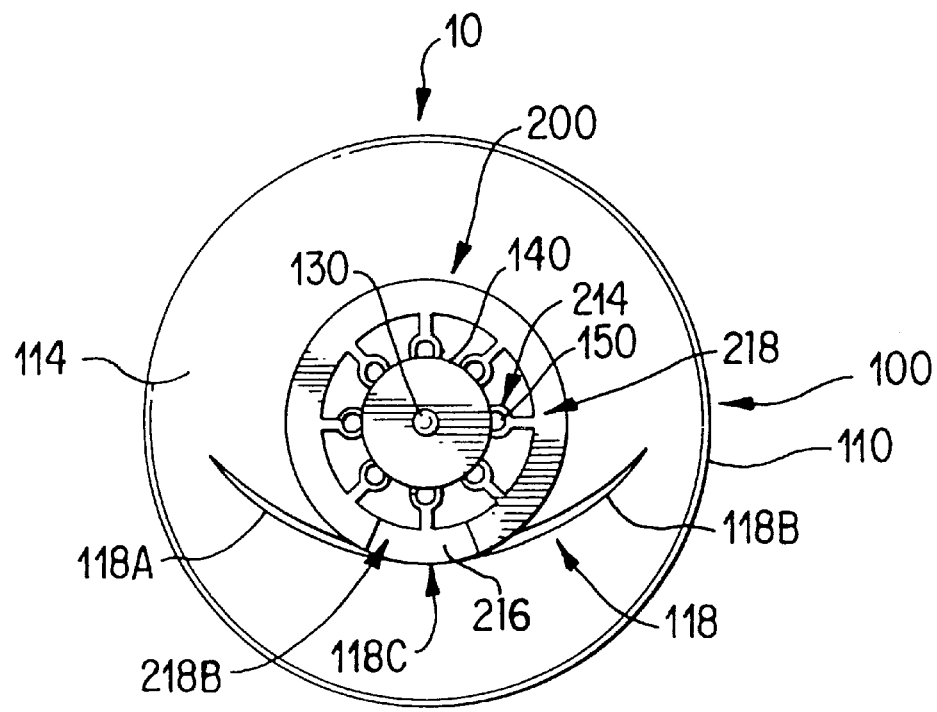
FIG. 6 is a top view of the fiber winding fixture and fiber storage device of FIG. 1.
Figure 7:
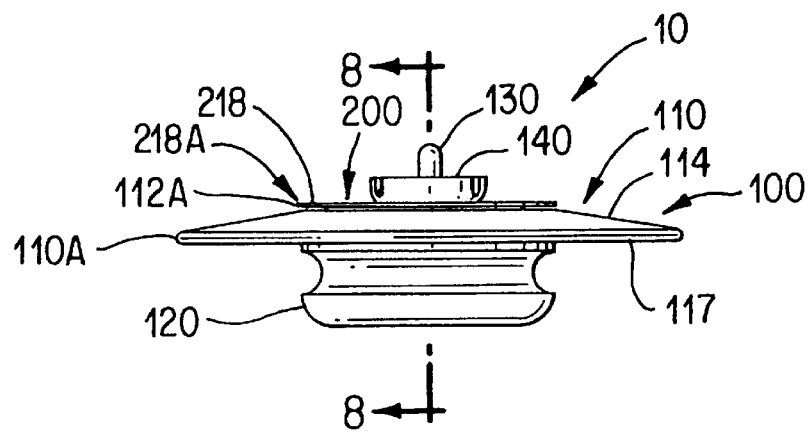
FIG. 7 is a side view of the fiber winding fixture and fiber storage device of FIG. 1.
Figure 8:
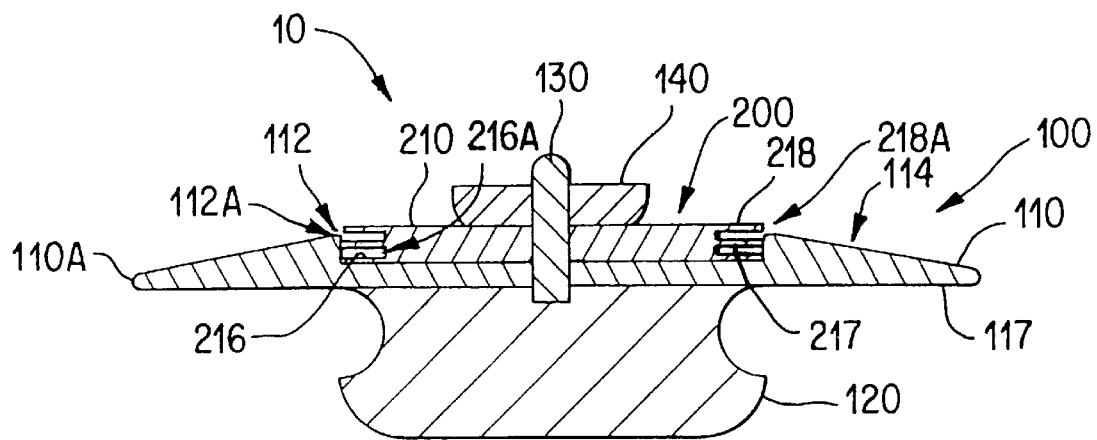
FIG. 8 is a cross-sectional view of the fiber winding fixture and fiber storage device as taken along line 8—8 of FIG. 7.

FIGS. 6 and 7 illustrate the fiber winding and storage assembly 10 of the present invention with the fiber storage device 200 positioned within fiber winding fixture 100. As can be seen in FIG. 6, securement member 150 has been received within one of the plurality of securement apertures 214 in fiber storage device 200. Thus, as mentioned previously, fiber storage device 200 is restrained against rotation within fiber winding fixture 100. As can be seen clearly in FIGS. 7 and 8, when fiber storage device 200 has been placed within recess 112 of winding structure 110, lower storage track 216A is completely disposed within recess 112 of winding structure 110. Additionally, a portion of upper track 218A is also received within recess 112 of winding structure 110. However, sufficient access to upper track 218A is provided such that the unjacketed portion of the length of fiber can be wound into upper track 218A. It can be understood by viewing FIGS. 7 and 8 that the slope of winding surface 114 will assist a user in guiding and winding the unjacketed fiber portion onto the upper storage track 218A.

The operation of the fiber winding and storage assembly 10 will now be provided. As mentioned above, the length of optical fiber that is to be stored on fiber storage device 200 consists of a jacketed portion and an unjacketed portion. For reference purposes, the jacketed portion will be described as containing a terminal end and a transition end. The terminal end is defined as the end of the jacketed portion that would be attached to another optical component and the transition end of the jacketed portion is defined as the end of the jacketed portion within the total length of fiber that transitions to the unjacketed portion. Likewise, the terminal end of the unjacketed portion is defined as the end of the overall length of optical fiber and the transition end of the unjacketed fiber is defined as the end of the unjacketed portion that transitions to the jacketed portion of the fiber.

In utilizing the present invention, prior to placing fiber storage device 200 into fiber winding fixture 100, the jacketed portion of the length of optical fiber is wound into the lower track 216A of fiber storage device 200. In winding the jacketed portion of the optical fiber into the lower track 216A, approximately one-quarter inch of the transition end of the jacketed portion is placed through the opening in center wall 217 such that it extends within the upper track 218A. This is accomplished in order to provide for a smooth transfer for the transition point in the optical fiber between the upper track and lower track. After the transition end of the jacketed portion of the optical fiber has been placed within the opening in center wall 217 as described above, the jacketed fiber is wound within the lower track 216A until there is about ten inches remaining at the terminal end of the jacketed portion. The fiber storage device 200 is then placed within the recess 112 in the winding structure 110. When the fiber storage device 200 is positioned within recess 112 of fiber winding fixture 100, the openings in the top wall 218 and center wall 217 should be placed such that they are adjacent to the transition portion 118C in groove 118, as can be seen in FIG. 6.

As can be understood, and as was described previously, as fiber storage device 200 is placed within fiber winding fixture 100, securement member 150 is aligned with one of the plurality of securement apertures 214 such that the securement member 150 is received within one of the securement apertures 214. When the fiber storage device 200 has been placed within fiber winding fixture 100, at least a portion of the terminal end of the jacketed portion is placed within groove 118. The terminal end of the jacketed portion can be taped within groove 118 in order to prevent it from exiting the groove and perhaps interfering with the unjacketed fiber as it is wound into the upper storage track 218A.

After the fiber storage device 200 has been placed within fiber winding fixture 100 and the terminal end of the jacketed portion has been placed within groove 118, the unjacketed portion of the optical fiber is then wound into the upper track 218A of the fiber storage device 200. The unjacketed fiber is guided into the upper track 218A by utilizing winding surface 114 of fiber winding fixture 100. After the unjacketed portion of the optical fiber has been wound into the upper track 218A, the terminal end of the unjacketed portion can be taped to the top of the fiber storage device 200 in order to ensure against unraveling of the unjacketed fiber from the upper storage track 218A. After the unjacketed fiber has been stored in the upper track 218A, the tape, if utilized, that was securing the terminal end of the jacketed portion of the optical fiber within groove 118 is removed. Fiber storage device 200 is then removed from fiber winding fixture 100. The terminal ends of both the jacketed portion and the unjacketed portion can then be placed within their respective tracks and thus, the total length of the optical fiber has now been stored on fiber storage device 200.

Fiber storage device 200 can be manufactured from any of a variety of materials including plastics and/or metals. Similarly, fiber winding fixture 100 may be made from either a plastic or a metal material. For example, fiber winding fixture 100 could be manufactured from an anti-static material such as Pomalux®-SD-A, which is manufactured by the Westlake Plastic Company, or a nylon material. Fiber storage device 200 can be coated with an anti-wear Teflon® coating such as NEDOX® which is available from General Magnaplate, Inc.

Whereas fiber winding fixture 100 is disclosed as including a handle member 120, a mounting member 130 and a retaining member 140, these components are not required when practicing the present invention. For example, a handle member 120 that is designed so that a user is able to hold the fiber winding fixture 100 in his/her hands is not required. Any type of securement structure could be provided on fiber winding fixture 100 that would provide for stabilizing the fiber winding fixture 100 as optical fiber is wound onto fiber storage device 200. For example, the structure of the fiber winding fixture itself, or a circular or square-shaped structure provided on the underside of the fiber winding fixture, could be utilized as the securement structure that could be, for example, grasped in a vice-like device to stabilize the fixture as fiber is wound onto it.

Whereas it was disclosed that prior to placing fiber storage device 200 into fiber winding fixture 100, the jacketed portion of the length of optical fiber is wound into the lower track 216A of fiber storage device 200, it is not required that the jacketed portion be first wound onto the storage device before placing the storage device in the winding fixture. The storage device could first be placed in the winding fixture so that the upper track 218A is received within recess 112 of winding fixture 100 and, therefore, the lower track 216A is accessible. The user could then wind the jacketed portion onto the lower track 216A by utilizing the winding fixture 100 to assist the user. The user would then remove the storage device from the winding fixture, turn the storage device over, and place the storage device back into the winding fixture recess so that now the lower track 216A is received within the recess and the upper track 218A is now accessible for winding the unjacketed fiber onto it as described previously. Thus, both the jacketed fiber and the unjacketed fiber can be wound onto the storage device by utilizing the fiber winding fixture. In order to utilize the fiber winding fixture to wind both the jacketed and unjacketed portions of the fiber onto the storage device, the depth of recess 112 would have to be such that each of the storage tracks are accessible when the other of the storage tracks is received within the recess.

The disclosed embodiments are illustrative of the various ways in which the present invention may be practiced. Other embodiments can be implemented by those skilled in the art without departing from the spirit and scope of the present invention.

What is claimed is:

1. A fiber winding fixture comprising:
 a winding structure having a first side and a second side, wherein said first side defines a recess therein and wherein said first side includes a winding surface, said winding surface extending from said recess at a first location to an outer diameter of said winding structure at a second location, said winding surface sloping from said first location to said second location;
 a handle member, said handle member attached to said second side of said winding structure; and
 a mounting member, said mounting member disposed within said recess of said winding structure and extending perpendicularly therefrom.

2. The fiber winding fixture of claim 1 further comprising a retaining member, said retaining member attached to said mounting member.

3. The fiber winding fixture of claim 1 further comprising a securement member, said securement member disposed within said recess of said winding structure and extending perpendicularly therefrom and wherein said mounting member is centrally disposed within said recess of said winding structure and said securement member is positioned off-set from a central axis of said recess.

4. The fiber winding fixture of claim 1 wherein said first side of said winding structure defines a groove.

5. In combination with the fiber winding fixture of claim 1, a fiber storage device comprising:
 a support structure having a central axis, said support structure defining a mounting aperture extending therethrough, said mounting aperture aligned with said central axis;
 said support structure including:
  a first storage track disposed on an outer circumference of said support structure; and
  a second storage track disposed on said outer circumference of said support structure;
 wherein said fiber storage device is received within said recess of said winding structure and wherein said mounting member is received within said mounting aperture.

6. The fiber winding fixture and fiber storage device of claim 5 wherein when said fiber storage device is received within said recess of said winding structure one of said first and second storage tracks is disposed within said recess and at least a portion of the other of said first and second storage tracks is disposed outside of said recess.

7. The fiber winding fixture and fiber storage device of claim 5 wherein said support structure defines a plurality of securement apertures wherein each of said securement apertures are off-set from said central axis of said support structure.

8. The fiber winding fixture and fiber storage device of claim 5 wherein a wall separates said first storage track from said second storage track and wherein said wall defines an opening therethrough.

9. A fiber winding fixture for winding fiber onto a fiber storage device wherein said fiber storage device includes a first storage track and a second storage track, comprising:
 a winding structure having a first side and a second side, wherein said first side defines a recess therein and wherein said first side includes a winding surface, said winding surface sloped from said recess to an outer diameter of said winding structure, wherein said recess receives within it the fiber storage device and wherein when the fiber storage device is received within said recess one of the tracks of the fiber storage device is disposed within said recess and at least a portion of the other of the tracks extends above said recess; and
 a securement structure, said securement structure disposed on said second side of said winding structure.

10. The fiber winding fixture of claim 9 further comprising a mounting member, said mounting member disposed within said recess of said winding structure.

11. The fiber winding fixture of claim 9 wherein said securement structure is a handle.

12. The fiber winding fixture of claim 10 further comprising a retaining member, said retaining member attached to said mounting member.

13. The fiber winding fixture of claim 9 wherein said first side of said winding structure defines a groove.

14. The fiber winding fixture of claim 13 wherein said groove extends around a portion of said winding surface.

15. A method for winding a length of optical fiber on a fiber storage device, wherein said fiber storage device includes a first storage track and a second storage track, comprising the steps of:

winding a first jacketed portion of the length of optical fiber in the first storage track of the fiber storage device;

placing the fiber storage device into a recess defined by a fiber winding fixture; and winding a second unjacketed portion of the length of optical fiber in the second storage track of the fiber storage device.

16. The method of claim 15 wherein when said fiber storage device is placed into said recess defined by said fiber winding fixture said first storage track of said fiber storage device is disposed within said recess and at least a portion of said second storage track is disposed outside of said recess.

17. The method of claim 15 wherein said fiber winding fixture includes a groove and further comprising the step of placing at least a portion of an end of said first jacketed portion of the length of optical fiber in said groove.

18. The method of claim 15 further comprising the step of restraining said fiber storage device against rotation within said recess defined by said fiber winding fixture.

19. The method of claim 15 further comprising the step of locking said fiber storage device within said fiber winding fixture.

20. The method of claim 15 further comprising the step of aligning said fiber storage device within said recess defined by said fiber winding fixture.

21. A fiber winding and storage assembly comprising:

a fiber winding fixture, said fiber winding fixture having a first side and a second side and wherein said first side defines a recess therein and wherein said first side includes a winding surface, said winding surface sloped from said recess to an outer diameter of said fiber winding fixture; and a fiber storage device, said fiber storage device received within said recess.

22. The fiber winding and storage assembly of claim 21 wherein said fiber storage device includes a first storage track and a second storage track and wherein when said fiber storage device is received within said recess one of said storage tracks is completely received within said recess and at least a portion of the other of said storage tracks extends outside of said recess.

\* \* \* \* \*